(No Model.) 2 Sheets—Sheet 1.
C. C. NEWTON.
CLAMP FOR CIRCULAR SAWS.
No. 519,892. Patented May 15, 1894.
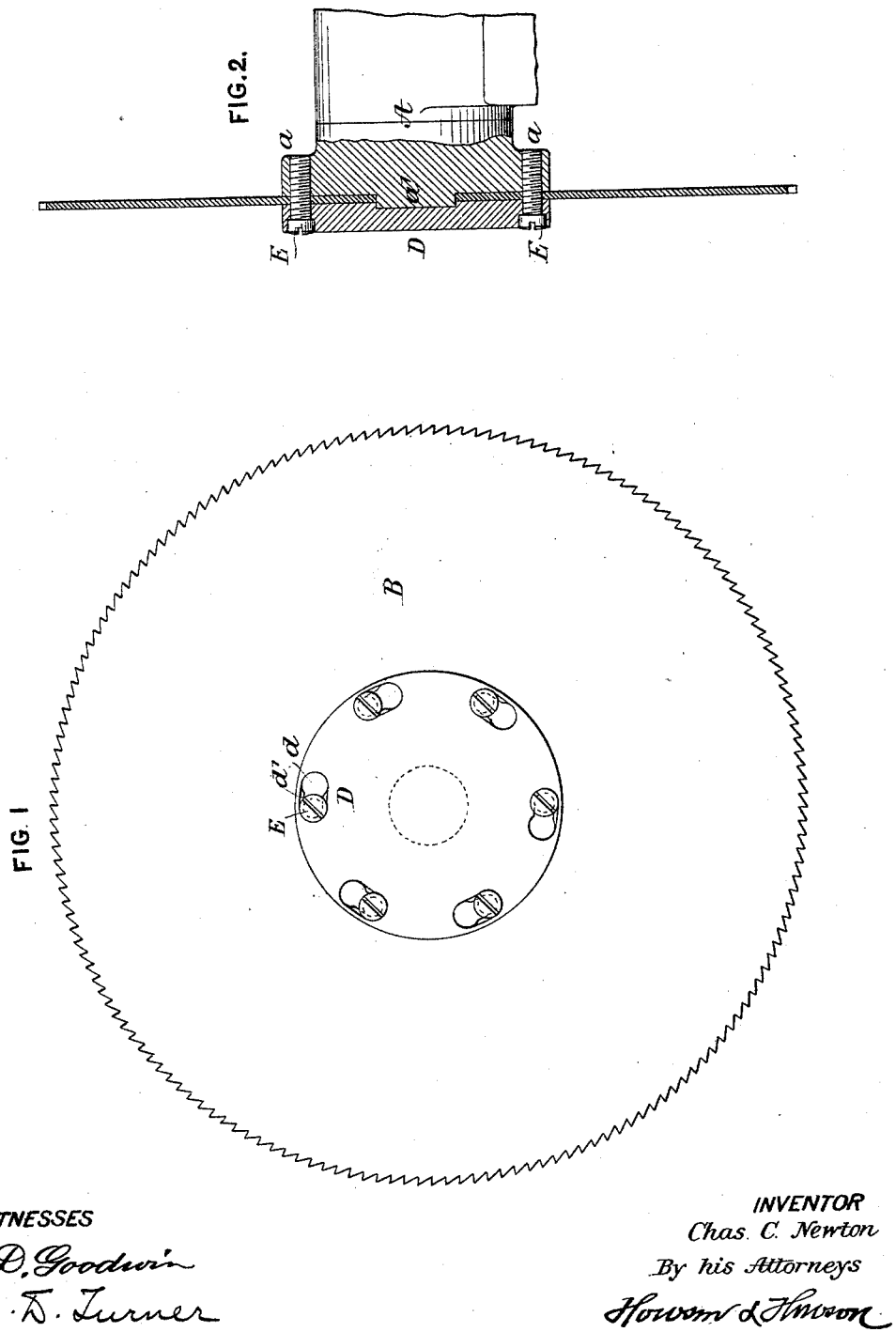
WITNESSES
F. D. Goodwin
H. D. Turner
INVENTOR
Chas. C. Newton
By his Attorneys
Howson & Howson (No Model.) 2 Sheets—Sheet 2.
C. C. NEWTON.
CLAMP FOR CIRCULAR SAWS.

No. 519,892. Patented May 15, 1894.

WITNESSES
F. D. Goodwin
K. D. Turner

INVENTOR
Chas. C. Newton
By his Attorneys
Howson & Howson

UNITED STATES PATENT OFFICE.

CHARLES C. NEWTON, OF PHILADELPHIA, PENNSYLVANIA.

CLAMP FOR CIRCULAR SAWS.

SPECIFICATION forming part of Letters Patent No. 519,892, dated May 15, 1894.

Application filed February 7, 1894. Serial No. 499,316. (No model.)

*To all whom it may concern:*

Be it known that I, CHARLES C. NEWTON, a citizen of the United States, residing in Philadelphia, Pennsylvania, have invented certain Improvements in Clamps for Circular Saws, of which the following is a specification.

The object of my invention is to so clamp a circular saw blade to the spindle, that it can be readily attached or detached without removing the confining screws.

My invention relates especially to circular saws for cutting cold metal in which the saw has to be rigidly fixed to the spindle.

Figure 3:
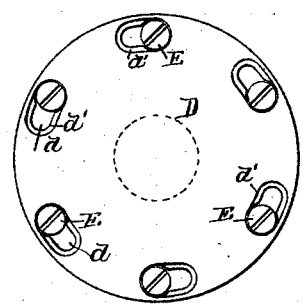
Figure 4:
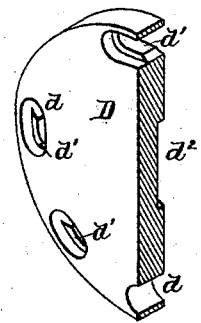
Figure 5:
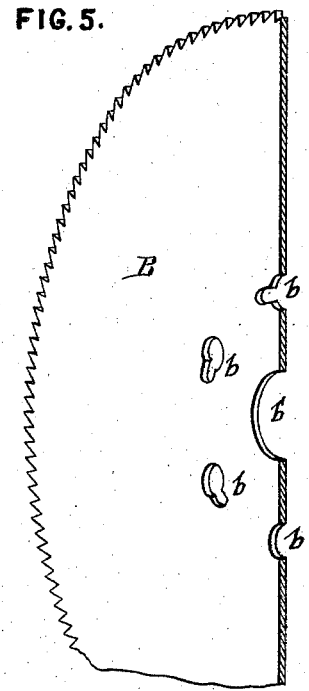
Figure 6:
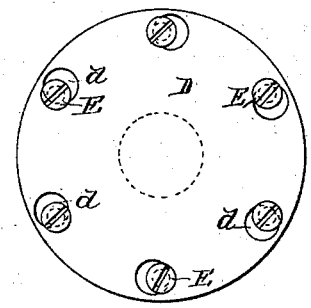

Referring to the accompanying drawings:—Figure 1 is a face view of the saw illustrating my improved clamp. Fig. 2, is a sectional view through the saw blade and sufficient of the spindle to illustrate my invention. Fig. 3, is a face view of the clamp plate showing it turned ready for removal. Fig. 4, is a sectional perspective view of the clamp plate. Fig. 5, is a sectional perspective view of the saw; and Fig. 6, is a view of a modification.

Metal saws for cutting cold metal have to be securely fastened to the spindle owing to the strain placed upon the saw in cutting through the cold metal; the saws have been usually fastened by means of a number of bolts passing through a disk, the saw and into the head of the spindle; but considerable time was consumed in adjusting the saw upon the spindle, and removing it when necessary. By my improvement the saw can be readily adjusted or removed by simply loosening the bolts.

A is the spindle which may be driven in any suitable manner; on the head $a$ of the spindle is a central stud $a'$ upon which is mounted the saw blade B; the stud passes through the hole $b'$ in the blade, and into a central recess $d^2$ in the clamp disk D, so that both the saw blade and clamp disk are centered. Near the periphery of the clamp disk is a series of elongated slots $d$ of a width equal to the diameter of the head of the screw bolts E; these slots have a reduced shouldered portion $d'$ at one end, and a screw head rests upon the shoulder. When the disk is in the position shown in Fig. 1, the bolts E pass through the clamp plate and holes $b$ in the saw, and into the head $a$ of the spindle, confining the clamp plate and saw to the spindle; but when the clamp plate is moved to the position shown in Fig. 3, it is free from the control of the bolt, and can be readily removed and as the holes $b$ in the blade, (Fig. 5) are made larger at one point than the heads of the screws E, the saw blade can also be readily removed from the spindle without removing the screws E. The saw is centered by the stud $a'$ and thus considerable strain is taken off the bolts and very little care has to be exercised in adjusting the saw on the spindle head.

In Fig. 5, I have shown a cheap modification of the clamp plate, by simply making large circular holes in the plate and allowing the heads of the bolts to overlap the edges of their respective openings; but I prefer the construction shown in Figs. 1 and 2, as it not only securely fastens the clamp plate and saw to the spindle, but the heads of the bolts are countersunk.

I claim as my invention—

1. The combination of the spindle, the saw, holes therein, a clamp plate, holes in said clamp plate aligning with the holes in the saw, with bolts passing through the clamp plate and saw blade into the spindle, the heads of said bolts being less in diameter than the holes in the saw blade and clamp plate, said bolt heads overlapping the edge of the hole in the clamp plate thus securing the saw to the spindle, substantially as set forth.

2. The combination of the spindle, the saw, elongated holes therein, a clamp plate, elongated slots in said clamp plate aligning with the holes in the saw, one portion of said slots being reduced in width and countersunk forming shoulders with headed screw bolts passing through the slots and holes, and into the spindle, the heads of said bolts resting upon the shouldered portions of the clamp plate, substantially as set forth.

3. The combination of the spindle, a central stud $a'$ upon which the saw is mounted, a saw and clamp plate, holes in both the saw and clamp plate, with headed bolts passing through said holes and into the spindle, said holes being larger in diameter than the head of the bolts and the heads of the bolts overlapping one edge of the holes so that when the clamp plate is turned it can be readily freed from the bolts and removed with the saw, substantially as set forth.

In testimony whereof I have signed my name to this specification in the presence of two subscribing witnesses.

CHARLES C. NEWTON.

Witnesses:
H. W. CHAMPION,
E. J. HANNUM.